United States Patent
Akita et al.

(10) Patent No.: US 10,673,030 B2
(45) Date of Patent: Jun. 2, 2020

(54) ELECTROCHEMICAL CELL PACKAGING MATERIAL

(71) Applicant: DAI NIPPON PRINTING CO., LTD., Tokyo (JP)

(72) Inventors: Hirohisa Akita, Fukuoka (JP); Masataka Okushita, Tokyo (JP); Daisuke Watanabe, Fukuoka (JP); Kazuhiko Yokota, Fukuoka (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 162 days.

(21) Appl. No.: 14/353,198

(22) PCT Filed: Nov. 8, 2012

(86) PCT No.: PCT/JP2012/078990
§ 371 (c)(1),
(2) Date: Apr. 21, 2014

(87) PCT Pub. No.: WO2013/069730
PCT Pub. Date: May 16, 2013

(65) Prior Publication Data
US 2014/0335403 A1 Nov. 13, 2014

(30) Foreign Application Priority Data

Nov. 11, 2011 (JP) .................................. 2011-247876
Dec. 28, 2011 (JP) .................................. 2011-289057
(Continued)

(51) Int. Cl.
*H01M 2/02* (2006.01)
*B32B 27/30* (2006.01)
(Continued)

(52) U.S. Cl.
CPC ............. *H01M 2/0287* (2013.01); *B32B 7/12* (2013.01); *B32B 15/085* (2013.01);
(Continued)

(58) Field of Classification Search
CPC ............. H01M 2/0287; H01M 2/0292; H01M 2/0295; H01M 2/029; H01M 2/0267;
(Continued)

(56) References Cited

U.S. PATENT DOCUMENTS 6,472,065 B1 * 10/2002 Alahapperuma ...... C09J 7/0217
428/343
7,285,334 B1 * 10/2007 Yamashita .......... H01M 2/0267
428/220
(Continued)

FOREIGN PATENT DOCUMENTS

JP    2001-68074    3/2001
JP    2001-260275    9/2001
(Continued)

OTHER PUBLICATIONS

JP2002352778 English Machine Translation (Mar. 2016).*
International Search Report issued in International Application No. PCT/JP2012/07899 dated Jan. 15, 2013.

*Primary Examiner* — Ula C Ruddock
*Assistant Examiner* — Matthew W Van Oudenaren
(74) *Attorney, Agent, or Firm* — Oliff PLC (57) ABSTRACT

Provided is an electrochemical cell packaging material with excellent electrolyte resistance. An electrochemical cell packaging material includes the following in a laminated structure: a substrate layer that, at a minimum, includes resin film; a protective layer that is arranged as the outermost layer and protects the substrate layer; a thermal adhesion layer that is arranged as the innermost layer and which includes thermal adhesion resin; and a barrier layer that includes metal foil and is arranged between the substrate
(Continued)

layer and the thermal adhesion layer. The protective layer is formed of an epoxy resin that has bisphenol A or bisphenol F as an element in the backbone.

7 Claims, 7 Drawing Sheets

(30) Foreign Application Priority Data

Jan. 26, 2012 (JP) ................. 2012-014126
Jan. 26, 2012 (JP) ................. 2012-014130

(51) Int. Cl.
  *B32B 27/38* (2006.01)
  *B32B 7/12* (2006.01)
  *B32B 15/085* (2006.01)
  *H01M 10/052* (2010.01)

(52) U.S. Cl.
  CPC ............ *B32B 27/304* (2013.01); *B32B 27/38* (2013.01); *H01M 2/0292* (2013.01); *H01M 2/0295* (2013.01); *H01M 10/052* (2013.01)

(58) Field of Classification Search
  CPC .. H01M 2/0275; H01M 2/0277; H01M 2/028; H01M 2/0282; H01M 10/052; B32B 27/38; B32B 27/12; B32B 27/304; B32B 15/085
  See application file for complete search history.

(56) References Cited

U.S. PATENT DOCUMENTS

| | | | |
|---|---|---|---|
| 2002/0164441 A1* | 11/2002 | Amine | B32B 15/08 428/35.2 |
| 2003/0008088 A1* | 1/2003 | Matsubara | H01G 9/08 428/35.7 |
| 2003/0180609 A1 | 9/2003 | Yamashita et al. | |
| 2004/0183215 A1* | 9/2004 | Fujieda | C08G 59/68 257/793 |
| 2007/0196619 A1* | 8/2007 | Carter | B32B 5/12 428/113 |
| 2008/0241663 A1* | 10/2008 | Yamashita | H01M 2/021 429/122 |
| 2009/0029245 A1* | 1/2009 | Ibaragi | B32B 15/08 429/176 |
| 2009/0186270 A1 | 7/2009 | Harada et al. | |
| 2009/0191456 A1* | 7/2009 | Yamamoto | H01M 2/0207 429/163 |
| 2010/0227213 A1* | 9/2010 | Hata | B32B 7/12 429/163 |
| 2012/0135301 A1* | 5/2012 | Akita | H01M 2/0212 429/185 |
| 2013/0164606 A1 | 6/2013 | Hata | |
| 2014/0205894 A1 | 7/2014 | Akita et al. | |

FOREIGN PATENT DOCUMENTS

| | | | |
|---|---|---|---|
| JP | 2002056823 | * | 2/2002 |
| JP | 2002-352778 | | 12/2002 |
| JP | 2002352778 | * | 12/2002 |
| JP | 2003-7261 | | 1/2003 |
| JP | 2007-294382 A | | 11/2007 |
| JP | 2008-288117 | | 11/2008 |
| JP | 2010-086831 A | | 4/2010 |
| JP | 2011-54563 | | 3/2011 |
| WO | 2011/016506 A1 | | 2/2011 |

* cited by examiner

ELECTROCHEMICAL CELL PACKAGING MATERIAL

TECHNICAL FIELD

The present invention relates to an electrochemical cell packaging material for packaging an electrochemical cell.

BACKGROUND ART

A conventional electrochemical cell packaging material is disclosed in Patent Document 1 listed below. This packaging material is a laminated material composed of a base material layer as the outermost layer, a barrier layer, and a thermally adhesive layer as the innermost layer which are laminated successively. Putting the thermally adhesive layer against another and heat-sealing them together around the periphery produces a packaging member for an electrochemical cell. The packaging member encloses a space for housing cell elements, such as electrolyte liquid and separators, and the housing space is formed by press-forming the packaging material cut in a rectangular shape.

In recent years, electronic devices that incorporate electrochemical cells have been made increasingly compact and slim, and to allow electrochemical cells to be housed in narrow spaces, packaging members for electrochemical cells need to be formed in thin, sharp shapes. To achieve that, according to Patent Document 1, an oriented nylon film is used as the base material layer for its excellent formability.

LIST OF CITATIONS

Patent Literature

Patent Document 1: Japanese Patent Application Publication No. 2008-288117

SUMMARY OF THE INVENTION

Problem to be Solved by the Invention

Inconveniently, however, with the packaging material mentioned above, during the filling of the packaging member with electrolyte liquid composed of an alkyl carbonate ester (such as dimethyl carbonate or ethyl carbonate), a chlorine or fluorine-containing lithium salt, etc., if the electrolyte liquid adheres to the top surface of the packaging member, the oriented nylon film forming the base material layer is corroded (whitened) by the electrolyte liquid, leading to a defect in appearance.

In view of the inconvenience discussed above, an object of the present invention is to provide an electrochemical cell packaging material that has excellent resistance to electrolyte liquid.

Means for Solving the Problem

To achieve the above object, according to the present invention, an electrochemical cell packaging material includes, as layers laminated together, at least: a base material layer formed of a resin film; a protective layer arranged as an outer layer, for protecting the base material layer; a thermally adhesive layer arranged as an innermost layer and formed of a thermally adhesive resin; and a barrier layer arranged between the base material layer and the thermally adhesive layer and formed of a metal foil. Moreover, the protective layer is formed of an epoxy resin having bisphenol A or bisphenol F as skeletal units.

With this structure, the protective layer formed of an epoxy resin having bisphenol A or bisphenol F as skeletal units is excellent in resistance to electrolyte liquid, and in addition helps prevent defects in appearance due to cracks in resin (whitening due to fine cracks during forming (drawing).

According to the present invention, an electrochemical cell packaging material is includes, as layers laminated together, at least: a base material layer formed of a resin film; a protective layer arranged as an outer layer, for protecting the base material layer; a thermally adhesive layer arranged as an innermost layer and formed of a thermally adhesive resin; and a barrier layer arranged between the base material layer and the thermally adhesive layer and formed of a metal foil. Moreover, the base material layer and the barrier layer are bonded together by dry lamination with an adhesive containing a pigment, and the protective layer is formed of an epoxy resin having bisphenol A or bisphenol F as skeletal units.

With this structure, since the adhesive with which the base material layer and the barrier layer are bonded together by dry lamination contains a pigment, the inner side of the base material layer is colored. Moreover, the protective layer formed of an epoxy resin having bisphenol A or bisphenol F as skeletal units is excellent in resistance to electrolyte liquid, and in addition helps prevent defects in appearance due to cracks in resin (whitening due to fine cracks during forming (drawing).

According to the present invention, an electrochemical cell packaging material is includes, as layers laminated together, at least: a base material layer formed of a resin film; a protective layer arranged as an outer layer, for protecting the base material layer; a thermally adhesive layer arranged as an innermost layer and formed of a thermally adhesive resin; and a barrier layer arranged between the base material layer and the thermally adhesive layer and formed of a metal foil. Moreover, the base material layer and the barrier layer are bonded together by dry lamination with an adhesive containing a pigment, and the protective layer is formed of at least one resin selected from the group consisting of polyvinylidene chloride, vinylidene chloride-vinyl chloride copolymer, anhydrous maleic acid-modified polypropylene, polyester resin, phenol resin, fluorine resin, cellulose ester, olefin resin, urethane resin, and acrylic resin.

With this structure, since the adhesive with which the base material layer and the barrier layer are bonded together by dry lamination contains a pigment, the inner side of the base material layer is colored. Moreover, the protective layer formed of at least one resin selected from the group consisting of polyvinylidene chloride, vinylidene chloride-vinyl chloride copolymer, anhydrous maleic acid-modified polypropylene, polyester resin, phenol resin, fluorine resin, cellulose ester, olefin resin, urethane resin, and acrylic resin is excellent in resistance to electrolyte liquid.

According to the present invention, in the electrochemical cell packaging material structured as described above, the protective layer is formed of a resin composed of polyfunctional urethane acrylate having a functional group number of 5 or more with respect to the acryloyl group and containing a photopolymerization initiator. With this structure, the protective layer can easily be formed by irradiation with light.

According to the present invention, in the electrochemical cell packaging material structured as described above, the pigment is carbon black. With this structure, the electrochemical cell packaging material is colored black, and is excellent in particular in designability.

According to the present invention, in the electrochemical cell packaging material structured as described above, the protective layer contains a fine-particle filler. With this structure, the surface of the protective layer containing a fine-particle filler has a matte appearance. This gives designability to the surface of the electrochemical cell packaging material. It also gives slippability to the surface of the protective layer having a fine-particle filler added to it, and stabilizes the formability of the packaging member during press-forming.

According to the present invention, in the electrochemical cell packaging material structured as described above, the fine-particle filler is silica. With this structure, it is possible to prevent defects in appearance due to cracks in resin (whitening due to fine cracks during forming (drawing)).

According to the present invention, in the electrochemical cell packaging material structured as described above, a slipping agent layer is provided on a surface of the protective layer.

According to the present invention, in the electrochemical cell packaging material structured as described above, the slipping agent layer is formed of an aliphatic amide-based resin.

Advantageous Effects of the Invention

According to the present invention, owing to the provision of the protective layer formed of epoxy resin containing bisphenol A or bisphenol F as skeletal units, it is possible to provide an electrochemical cell packaging material that prevents corrosion (whitening) of the base material layer due to adhesion of electrolyte liquid and that is free from defects in appearance due to cracks in resin (whitening due to fine cracks) during forming.

Moreover, according to the present invention, by dry-laminating together the base material layer and the barrier layer with an adhesive containing a pigment, the inner side of the base material layer is colored. Moreover, the coloring makes it possible to provide an electrochemical cell packaging material that is excellent also in designability.

Moreover, according to the present invention, owing to the provision of the protective layer formed of at least one resin selected from the group consisting of polyvinylidene chloride, vinylidene chloride-vinyl chloride copolymer, anhydrous maleic acid-modified polypropylene, polyester resin, phenol resin, fluorine resin, cellulose ester, olefin resin, urethane resin, and acrylic resin, it is possible to prevent corrosion (whitening) of the base material layer due to adhesion of electrolyte liquid. Moreover, by dry-laminating together the base material layer and the barrier layer with an adhesive containing a pigment, the inner side of the base material layer is colored. Moreover, the coloring makes it possible to provide an electrochemical cell packaging material that is excellent also in designability.

DESCRIPTION OF EMBODIMENTS

First Embodiment

Figure 1:
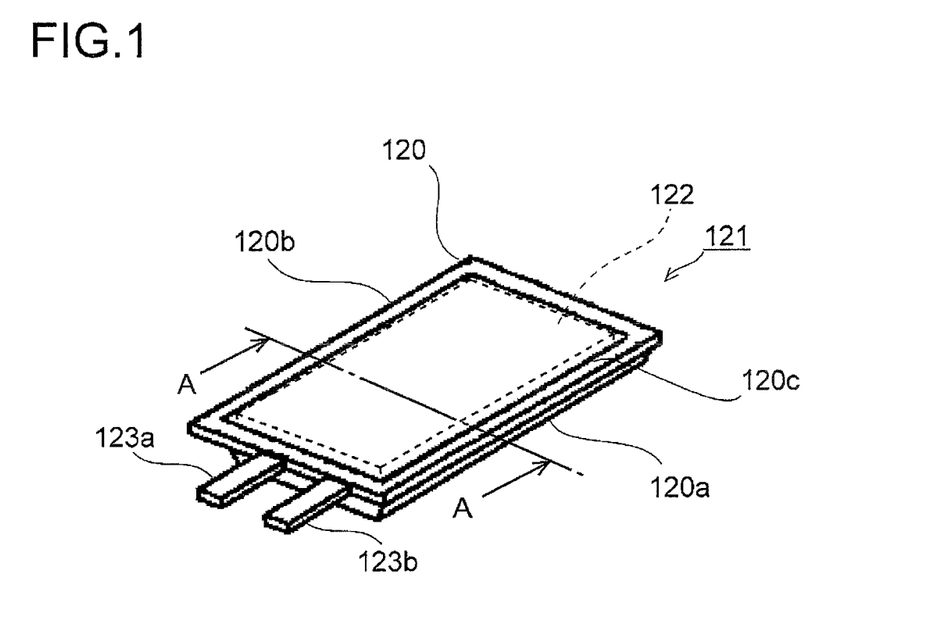
FIG. 1 is a perspective view of a lithium-ion cell according to a first embodiment of the present invention.
Figure 2:
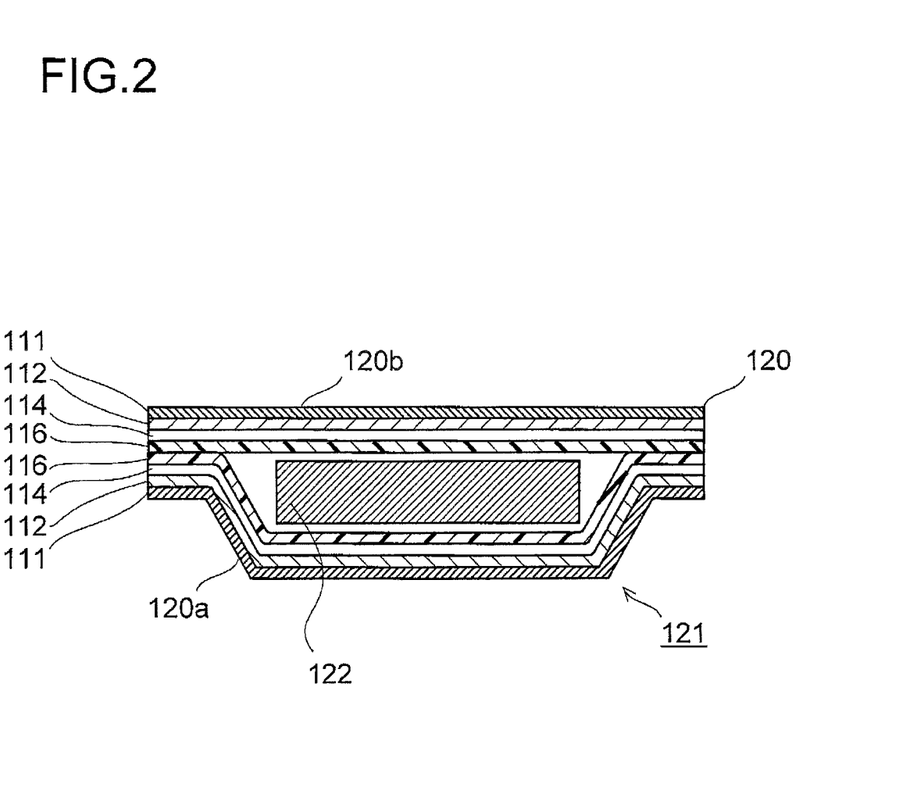
FIG. 2 is a sectional view along line A-A in FIG. 1.

Hereinafter, with reference to the accompanying drawings, an electrochemical cell packaging material 110 according to a first embodiment of the present invention will be described. FIG. 1 is a perspective view of a lithium-ion cell 121 according to one embodiment, and FIG. 2 is a sectional view along line A-A in FIG. 1.

The lithium-ion cell 121 is composed of a lithium-ion cell module 122 containing electrolyte liquid housed inside a packaging member 120. The packaging member 120 is composed of a housing portion 120a in which the lithium-ion cell module 122 is housed, and a sheet portion 120b which covers the housing portion 120a.

The packaging member 120 has the housing portion 120a and the sheet portion 120b thermobonded together at a thermally adhesive portion 120c at which they overlap each other, so as to have a sealed interior. Here, a cathode tab 123a and an anode tab 123b which are coupled to the lithium-ion cell module 122 extend out through the thermally adhesive portion 120 while being held between the housing portion 120a and the sheet portion 120b with a tab film (not illustrated) interposed.

The lithium-ion cell module 122 is composed of a cell which includes: a cathode (positive electrode), which is composed of a cathode active material and a cathode charge collector; an anode (negative electrode), which is composed of an anode active material and an anode charge collector; and electrolyte liquid which fills between the cathode and the anode. The cell is composed of a plurality of cathode plates, from which cathode charge collectors extend, and a plurality of anode plates, from which anode charge collectors extend, laminated on one another. The plurality of cathode plates and the plurality of anode plates are laminated alternately with separators interposed. The plurality of cathode and anode charge collectors thus laminated lie over one another to be coupled to one cathode tab 123a and one anode tab 123b respectively.

Figure 3:
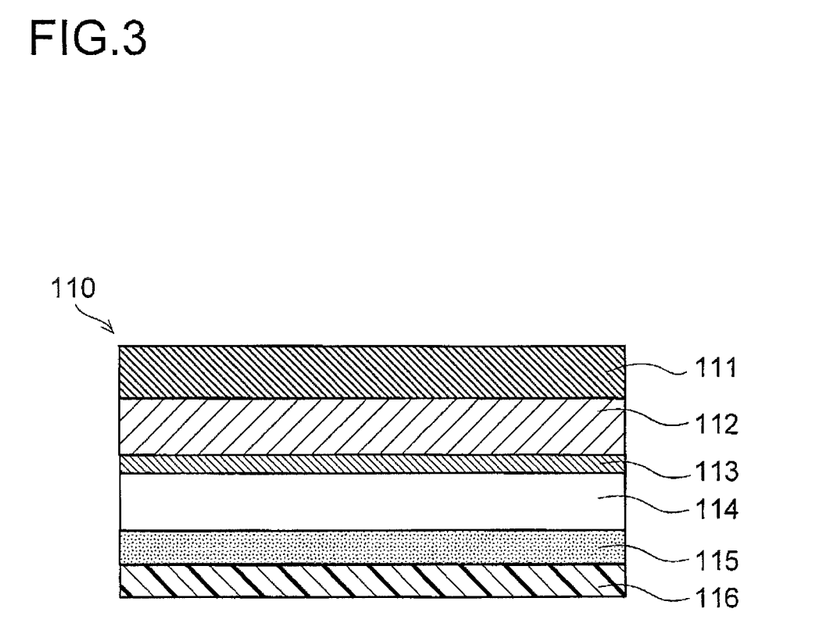
FIG. 3 is a schematic sectional view showing the layer structure of a packaging material according to the first embodiment of the present invention.

FIG. 3 is a schematic sectional view showing the layer structure of a packaging material 110 that forms the housing portion 120a and the sheet portion 120b. The packaging material 110 is composed of a protective layer 111, a base material layer 112, a barrier layer 114, and a thermally adhesive layer 116 laminated successively. The base material layer 112 and the barrier layer 114 are bonded together with an adhesive layer 113 interposed, and the barrier layer 114 and the thermally adhesive layer 116 are bonded together with an acid-modified polyolefin layer 115 interposed. Chemical conversion treatment is applied to both surfaces of the barrier layer 114 to increase the interlayer bonding strength between the barrier layer 114 and the acid-modified polyolefin layer 115 and between the barrier layer 114 and the adhesive layer 113.

As shown in FIG. 2, the housing portion 120a is fabricated by press-forming a piece of the packaging material 110 cut in a rectangular shape. The fabrication procedure proceeds as follows: the packaging material 110 is placed on a concave mold with the protective layer 111 side of the former facing the latter; the packaging material 110 is then, from its thermally adhesive layer 116 side, cold-formed using a convex mold into a predetermined forming depth. The housing portion 120 and the sheet portion 120b are thermobonded together at their respective, mutually facing, thermally adhesive layers 116.

The base material layer 112 gives the packaging member 120 high pierce resistance (pinhole resistance), electrical insulation, handleability, etc., and needs to have sufficient malleability to withstand pressing for embossing.

For the base material layer 112, any arbitrarily selected film or sheet of resin such as an oriented polyester resin or an oriented nylon resin may be used. Examples of polyester resins include polyethylene terephthalate, polybutylene terephtharate, polyethylene naphthalate, polybutylene naphthalate, copolymerized polyester, and polycarbonate. Examples of nylon resins include polyamide resins, that is, nylon 6, nylon 6.6, copolymer of nylon 6 and nylon 6.6, nylon 6.10, and poly-meta-xylylene adipamide (MXD6).

As the base material layer 112, to enhance pinhole resistance, and to enhance electrical insulation required in a packaging member for an electrochemical cell, instead of using a polyester film or a nylon film, it is possible to laminate together films of different materials.

The protective layer 111 is arranged as an outer layer to protect the base material layer 112, preventing it from being corroded (whitened) by adhesion of electrolyte liquid. The protective layer 111 is formed of an epoxy resin having bisphenol A or bisphenol F as skeletal units. This helps prevent corrosion (whitening) by electrolyte liquid, and also helps prevent defects in appearance due to cracks in resin (whitening due to fine cracks) during forming (drawing).

One example of such an epoxy resin is a resin having bisphenol A or bisphenol F as skeletal units and obtained through repetition of a dehydrochlorination reaction and an addition reaction between epichlorohydrin and bisphenol A or bisphenol F. Another example is a resin obtained through repetition of an addition reaction between an epoxy compound having two or more, preferably two, glycidyl groups and bisphenol A or bisphenol F.

Here, examples of epoxy compounds include sorbitol polyglycidyl ether, polyglycerol polyglycidyl ether, pentaerythritol polyglycidyl ether, diglycerol polyglycidyl ether, trimethylolpropylene polyglycidyl ether, polyethylene glycol diglycidyl ether, and polypropylene glycol diglycidyl ether.

There is no particular restriction on the epoxy equivalent of the epoxy resin (the chemical formula weight of the epoxy resin per epoxy group, that is, the value obtained by dividing the molecular mass of the epoxy resin by the number of epoxy groups contained in the epoxy resin); however, it is preferable that the epoxy equivalent fall within the range from 100 to 500. An epoxy equivalent of 5000 or more may lead to an inferior appearance of the applied film.

Incidentally, epoxy resins are known that are obtained through repetition of an addition reaction between the amino group and the glycidyl group; these, however, generally have poor chemical resistance, and are therefore not preferable.

The barrier layer 114 is formed of a metal foil, and prevents permeation of water vapor from outside into the lithium-ion cell 121. Moreover, to stabilize pinholes in, and the forming suitability (with respect to pouching and embossing) of, the barrier layer 114 itself, and to give it pinhole resistance, aluminum with a thickness of 15 μm or more is used.

In a case where the packaging member 120 is embossed, it is preferable that the material for the barrier layer 114 be aluminum containing 0.3% to 9.0% by weight of iron, more preferably 0.7% to 2.0% by weight of iron.

Compared with aluminum containing no iron, aluminum then has good malleability and develops less pinholes when bent as the packaging member 120. Moreover, when the packaging material 110 is embossed, a side wall can easily be formed. Incidentally, aluminum containing less than 0.3% by weight of iron provides no effect of preventing pinhole development, improving embossing suitability, etc. Aluminum containing more than 9.0% by weight of iron has impaired flexibility as aluminum and exhibits poor pouchability as a packaging material.

The aluminum produced by cold rolling for the barrier layer 114 changes its flexibility, firmness, and hardness depending on the conditions of annealing. For the barrier layer 114, aluminum of a soft type that is annealed is preferable to aluminum of a hard type that is not annealed.

Chemical conversion treatment, chromium-based or non-chromium-based, is applied to the surface of the barrier layer 114. Examples of chromium-based chemical conversion treatment include chromic acid chromating treatment, phosphoric acid chromating treatment, and application-type chromating treatment. Examples of non-chromium-based (application-type) chemical conversion treatment include chemical treatment using zirconium, titanium, or zinc phosphate. Among these, from the viewpoints of allowing continuous treatment, requiring no process of washing with water, and reducing treatment cost, application-type chemical conversion treatment is preferable. Particularly preferable is treatment using a treatment liquid containing aminated phenol polymer, a trivalent chromium compound, or a phosphorous compound.

The chemical conversion treatment is performed by applying the treatment liquid by an application method selected from well-known ones, such as bar-coating, roll-coating, gravure-coating, and immersion. Before the chemical conversion treatment is applied, it is preferable to perform, beforehand, degreasing treatment on the surface of the barrier layer 114 by a well-known degreasing method, such as alkali immersion, electrolytic washing, acid washing, or acid activation. This maximizes the function of chemical conversion treatment, and allows the function to last for a long period.

The thermally adhesive layer 116 is arranged as the innermost layer of the packaging material 110, and is formed of a thermally adhesive resin which melts under heat to fuse together mutually facing packaging materials 110. Moreover, depending on whether or not a tab film is interposed between the thermally adhesive layer 116 and the cathode tab 123a or the anode tab 123b, different species of resin are used. In a case where a tab film is interposed, a film of olefin resin alone or a mixture thereof or the like can be used. In a case where no tab film is interposed, a film of acid-modified olefin resin graft-modified with an unsaturated carboxylic acid can be used.

For the thermally adhesive layer 116, polypropylene is suitably used; instead, it is possible to use a film formed of a single layer or multiple layers of linear low-density polyethylene or middle-density polyethylene, or a single layer or multiple layers of a blended resin of linear low-density polyethylene and middle-density polyethylene.

Any of the above-mentioned different types of polypropylene, namely random propylene, homopropylene, block propylene, linear low-density polyethylene, and middle-density polyethylene, may contain low-crystalline ethylene-butene copolymer, low-crystalline propylene-butene copolymer, or terpolymer of three-component, namely ethylene-butene-propylene, copolymer, an antiblocking agent (AB agent) such as silica, zeolite, or acrylic resin beads, and a slipping agent based on an aliphatic acid amide, etc.

The acid-modified polyolefin layer 115 is a resin layer which stably bonds together the barrier layer 114 and the thermally adhesive layer 116, and acid-modified polypropylene is suitably used for it. The acid-modified polyolefin layer 115 needs to be selected to suit the species of resin used for the thermally adhesive layer 116. Accordingly, examples include, in a case where acid-modified polyolefin resin other than acid-modified polypropylene is used, polyolefin resin graft-modified with an unsaturated carboxylic acid, ethylene-acrylic acid copolymer graft-modified with an unsaturated carboxylic acid, propylene-acrylic acid copolymer graft-modified with an unsaturated carboxylic acid, ethylene-methacrylic acid copolymer graft-modified with an unsaturated carboxylic acid, propylene-methacrylic acid copolymer graft-modified with an unsaturated carboxylic acid, and metal-linked polyolefin resin graft-modified with an unsaturated carboxylic acid. Any of these resins may have, as necessary, 5% or more of a butene component, ethylene-propylene-butene copolymer, amorphous ethylene-propylene copolymer, propylene-α-olefin copolymer, or the like added to it.

In a case where acid-modified polypropylene is used, it is possible to use—
(1) a homotype with a Vicat softening point of 115° C. or more and a melting point of 150° C. or more;
(2) ethylene-propylene copolymer with a Vicat softening point of 105° C. or more and a melting point of 130° C. or more (a random copolymer type); or
(3) a substance, alone or a blend thereof, acid-modified using an unsaturated carboxylic acid with a melting point of 110° C. or more.

The adhesive layer 113 is a resin layer which firmly bonds together the base material layer 112 and the barrier layer 114. The bonding between these layers is achieved by a method such as dry lamination, extrusion lamination, co-extrusion lamination, or heat lamination.

In a case where the bonding is achieved by dry lamination, it is possible to use an adhesive based on polyester, polyethylene imine, polyether, cyanoacrylate, urethane, organic titanium, polyether urethane, epoxy, polyester urethane, imide, isocyalate, polyolefin, or silicone.

According to this embodiment, the protective layer 111 is formed of epoxy resin having bisphenol A or bisphenol F as skeletal units. Thus, the protective layer 111 has excellent resistance to electrolyte liquid, and it is possible to prevent defects in appearance due to cracks in resin (whitening due to fine cracks) during forming (drawing). It is thus possible to provide an electrochemical cell packaging material 110 that is excellent in resistance to electrolyte liquid and that is free from defects in appearance due to cracks in resin during forming (drawing).

In this embodiment, between adjacent ones of the above-mentioned layers, a different layer may be interposed. Although a lithium-ion cell 121 has been dealt with above, any electrochemical cell module other than a lithium-ion cell module 122 may be packaged in the packaging member 120 formed of the packaging material 110 to fabricate an electrochemical cell other than a lithium-ion cell 121.

For example, electrochemical cells include, other than lithium-ion cells, chemical cells such as nickel-hydride cells, nickel-cadmium cells, lithium-metal primary and secondary cells, and lithium-polymer cells, electric double-layer capacitors, capacitors, and electrolytic capacitor. Here, an electrochemical cell module includes all electrical device elements, namely a cell (electric power storage portion) including a cathode composed of a cathode active material and a cathode charge collector, an anode composed of an anode active material and an anode charge collector, and electrolyte liquid which fills between the cathode and the anode, electrode terminals coupled to the cathode and the anode inside the cell, etc.

Second Embodiment

Figure 4:
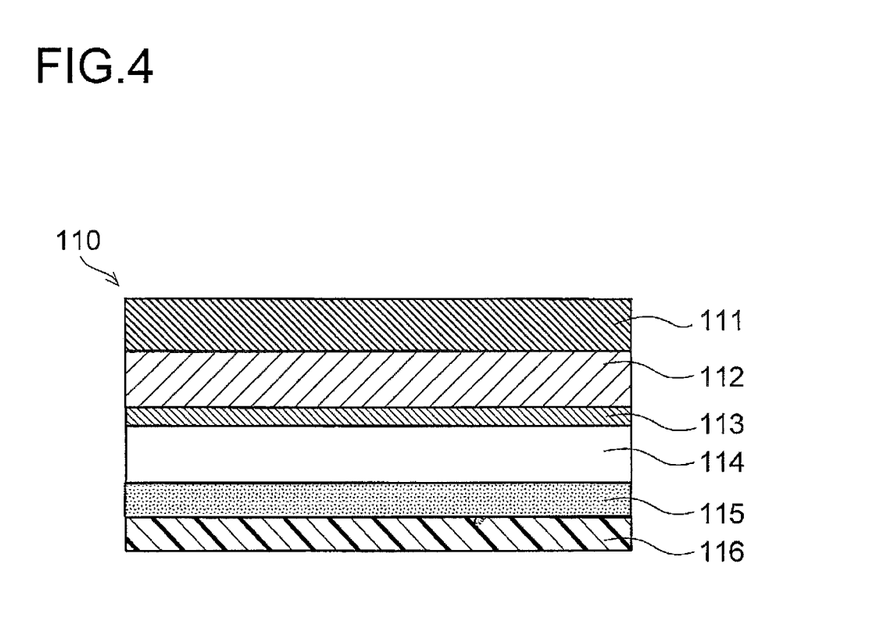
FIG. 4 is a schematic sectional view showing the layer structure of a packaging material according to a second embodiment of the present invention.

FIG. 4 is a sectional view showing a packaging material 110 for a packaging member 120 according to a second embodiment of the present invention. For the sake of convenience of description, such features as find their counterparts in the first embodiment shown in FIGS. 1 to 3 described above are identified by common reference signs. In the packaging material 110 according to this embodiment, the base material layer 112 and the barrier layer 114 are bonded together by dry lamination with an adhesive layer 113 interposed, and the adhesive used for the adhesive layer 113 contains a pigment.

The adhesive layer 113 is a layer which bonds together the base material layer 112 and the barrier layer 114 by dry lamination, and the adhesive contains a pigment. Examples of adhesives for the adhesive layer 113 include a polyvinyl acetate-based adhesive, polyacrylic acid ester-based adhesive, cyanoacrylate-based adhesive, ethylene copolymer-based adhesive, cellulose-based adhesive, polyester-based adhesive, polyamide-based adhesive, polyimide-based adhesive, amino resin-based adhesive, phenol resin-based adhesive, epoxy-based adhesive, polyurethane-based adhesive, reactive (meta)acrylic-based adhesive, rubber-based adhesive, silicone-based adhesive, and inorganic adhesive.

A polyacrylic acid ester-based adhesive is formed of a homopolymer of an ethyl, butyl, or 2-etylhexyl ester of acrylic acid, a copolymer thereof with methyl metacrylate, acrylonitrile, or styrene, or the like.

An ethylene copolymer-based adhesive is composed of a copolymer of ethylene with a monomer such as vinyl acetate, ethyl acrylate, acrylic acid, or metacrylic acid, or the like. An amino resin-based adhesive is composed of urea resin, melamine resin, or the like. A rubber-based adhesive is composed of chloroprene rubber, nitrile rubber, styrene-butadiene rubber, or the like. An inorganic adhesive is composed of alkali metal silicate, low-melting-point glass, or the like.

As the pigment contained in the adhesive of the adhesive layer 113, carbon black is used, so that the adhesive layer 113 is colored black. This gives the packaging material 110 an appearance that is perceived as black through the protective layer 111 and the base material layer 112.

It is preferable that the adhesive layer 113 be composed of an adhesive to which is added, as a pigment, 5% or more but 30% or less by weight of carbon black as a solid content, more preferably 10% or more but 25% or less by weight. A pigment content under 5% by weight leads to a faint color and produces an appearance with poor designability. A pigment content over 30% by weight weakens the bonding strength between the base material layer 112 and the barrier layer 114. This inconveniently causes, in the sealing process after the forming. the base material layer 112 to contact so as to restore its original shape, and causes the base material layer 112 and the barrier layer 114 to come off each other, leading to exfoliation and creases.

As the pigment for coloring, it is possible to use, other than carbon black, full-color coloring pigment and inorganic coloring pigments. Examples of full-color coloring pigments include azo-based pigments, phthalocyanine-based pigments, and condensed polycyclic substance-based pigments. Azo-based pigments include soluble pigments such as watching red and carmine 6C, and insoluble pigments such as monoazo yellow, disazo yellow, pyrazolone red, red, and permanent red. Phthalocyanine pigments include copper phthalocyanine pigments. Non-metallic phthalocyanine-based pigments include bluish and greenish pigments. Condensed polycyclic substance-based pigments include dioxyzine violet and quinacridone violet. As an inorganic coloring pigment, instead of carbon black, it is possible to use, for example, titanium oxide.

Instead of a coloring pigment such as titanium oxide, a pearl pigment or a fluorescent pigment may be used to color the adhesive layer 113. As pearl pigments, classically, powder of pearl or powder of an inside part of seashells was used; nowadays, fine flakes (thin particles) having an outside coated with a metal oxide or a mixture thereof is used. Examples of fine flakes include flakes of mica, flakes of talc, flakes of kaolin, flakes of bismuth oxychloride, flakes of glass, flakes of $SiO_2$, and flakes of synthetic ceramic. Examples of metal oxides for coating the outside of those fine flakes include, $TiO_2$, $Fe_2O_3$, $SnO_2$, $Cr_2O_3$, and ZnO. Among different combinations of the just-mentioned materials, preferable are flakes of mica, glass, or $SiO_2$ having an outside coated with $TiO_2$ or $Fe_2O_3$. The outside may be coated with $TiO_2$ and $Fe_2O_3$.

Usable as fluorescent pigments are phosphors, that is, substances that produce luminescence in the broad sense of the term, and they include inorganic and organic fluorescent pigments. An inorganic fluorescent pigment is obtained by baking a crystal of an oxide of Ca, Ba, Zn, Cd, or the like with an activator added to it. The main component may be a crystal of a sulfide of Ca, Ba, Zn, Cd, or the like, a crystal of a silicate, a crystal of a phosphate, or a crystal of a tungstate. As the activator, it is possible to use a metal element such as Mn, Zn, Ag, Cu, Sb, or Pb, or a rare-earth element such as a lanthanoid.

Examples of preferred phosphors include ZnO:Zn, $Br_5(PO_4)_3Cl$:Eu, $Zn_2GeO_4$:Mn, $Y_2O_3$:Eu, $Y(P, V)O_4$:Eu, and $Y_2O_2Si$:Eu. As an organic fluorescent pigment, it is possible to use a derivative of diaminostilbene disulfonic acid, a derivative of imidazole, a derivative of coumarine, a derivative of triazole, a derivative of carbazole, a derivative of pyridine, a derivative of naphthalic acid, a derivative of imidazolone, a dye (such as fluorescein or eosin), or any other compound having a benzene ring (such as anthracene).

In the process of bonding together the adhesive layer 113 and the barrier layer 114 with adhesive, it is difficult to perform the bonding without trapping any bubble at all. In particular, when an adhesive containing a pigment is applied to the metal foil side of the barrier layer 114 and then the resin film of the base material layer 112 is bonded, parts where bubbles are trapped appear as conspicuous defects in appearance. To avoid that, it is preferable to apply an adhesive having a pigment added to it to the resin-film side of the base material layer 112 and then bond the metal-foil side of the barrier layer 114.

As in the first embodiment, by forming the protective layer 111 out of an epoxy resin having bisphenol A or bisphenol F as skeletal units, it is possible to prevent corrosion (whitening) by electrolyte liquid, and also to prevent defects in appearance due to cracks in resin (whitening due to fine cracks) during forming (drawing). For the protective layer 111, any material having resistance to electrolyte liquid can be used; for example, it may be formed of at least one selected from the group consisting of polyvynilidene chloride, vynilidene chloride-vinyl chloride copolymer, anhydrous maleic acid-modified polypropylene, polyester, phenol resin, fluorine resin, cellulose ester, olefin resin, urethane resin, and acrylic resin. This helps prevent corrosion (whitening) with electrolyte liquid.

By forming the protective layer 111 out of a resin composed of polyfunctional urethane acrylate having a functional group number of 5 or more with respect to the acryloyl group and containing a photopolymerization initiator, it is possible to form a protective layer easily by irradiation with light. Here, the composition ratio of photoreactive functional groups in polyfunctional urethane acrylate is 50% to 95%.

Polyfunctional urethane acrylate is obtained by reacting polyfunctional acrylate having active hydrogen with polyisocyanate. One equivalent of active hydrogen in polyfunctional acrylate having active hydrogen is typically reacted with polyisocyanate in the range of 0.1 to 50 equivalents, and more preferably in the range of 0.1 to 10 equivalents. The reaction temperature is preferably in the range of 30° C. to 150° C., and more preferably in the range of 50° C. to 100° C. The end point of the reaction is calculated by a method in which the remaining amount of isocyanate is reacted with excess n-butyl amine and is then back-titrated with 1N hydrochloric acid. The end point is when the amount of isocyanate becomes 0.5% by weight or less.

Examples of photopolymerization initiators include benzoin compounds such as benzoin, benzoin methyl ether, benzoin ethyl ether, benzoin propyl ether, and benzoin isobutyl ether; acetophenone compounds such as acetophenone, 2,2-diethoxy-2-phenyl acetophenone, 1,1-dichloroacetophenone; 2-hydroxy-2-methyl phenyl propan-1-one, diethoxyacetophenone, 1-hydroxycyclohexyl phenyl ketone, and 2-methyl-1-[4-(methylthio)phenyl]-2-morpholino-propan-1-one; anthraquinone compounds such as 2-ethyl anthraquinone, 2-t-butyl anthraquinone, 2-chloroanthraquinone, and 2-amyl anthraquinone; thioxanthone compounds such as 2,4-diethyl thioxanthone, 2-isopropyl thioxanthone, and 2-chlorothioxanthone; ketals such as acetophenone dimethyl ketals and benzyl dimethyl ketals; benzophenone compounds such as benzophenone, 4-benzoyl-4'-methyl diphenyl sulfide, and 4,4'-bismethyl aminobenzophenone; and phosphine oxide compounds such as 2,4,6-trimethylbenzoyl diphenylphoshine oxide and bis(2,4, 6-trimethylbenzoyl)-phenylphosphine oxide.

The amount of the photopolymerization initiator used is, assuming that the solid content of the resin composition in the protective layer 111 is 100% by weight, 0.1% or more but 10% or less by weight, and more preferably 1% or more but 7% or less by weight.

According to this embodiment, through dry lamination between the base material layer 112 and the barrier layer 114 with adhesive (the adhesive layer 113) containing a pigment, the inner side of the base material layer 112 is colored. The coloring makes it possible to provide an electrochemical cell packaging material which is excellent also in designabity. Moreover, the protective layer 111 is formed of a material that is excellent in resistance to electrolyte liquid, namely at least one selected from the group consisting of polyvynilidene chloride, vynilidene chloride-vinyl chloride copolymer, anhydrous maleic acid-modified polypropylene, polyester, phenol resin, fluorine resin. cellulose ester, olefin resin, urethane resin, and acrylic resin. This helps prevent corrosion (whitening) by electrolyte liquid of the outer side of the base material layer 112 of which the inner side is colored.

In a case where the protective layer 111 is formed of an epoxy resin composition having bisphenol A or bisphenol F as skeletal units, it is possible, not only to prevent corrosion (whitening) by electrolyte liquid, but also to prevent defects in appearance due to cracks in resin (whitening due to fine cracks) during forming (drawing).

Incidentally, in a case where the protective layer 111 is formed of a resin composed of polyfunctional urethane acrylate having a functional group number of 5 or more with respect to the acryloyl group and containing a photopolymerization initiator, it is possible to form the protective layer easily by irradiation with light.

Third Embodiment

Figure 5:
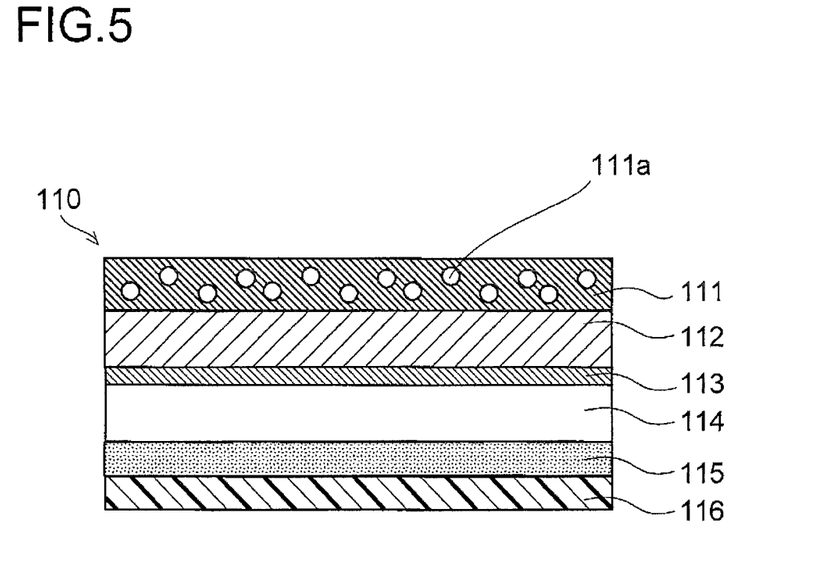
FIG. 5 is a schematic sectional view showing the layer structure of a packaging material according to a third embodiment of the present invention.

FIG. 5 is a sectional view showing an electrochemical cell packaging material 110 for a packaging member 120 according to a third embodiment of the present invention. For the sake of convenience of description, such features as find their counterparts in the first and second embodiments shown in FIGS. 1 to 4 described above are identified by common reference signs. In the packaging material 110 according to this embodiment, the protective layer 111 has, added to it, a fine-particle filler 111a with an average particle diameter of 0.2 μm to 3 μm as measured by a coulter counter method. This gives a matte appearance to the surface of the protective layer 111 containing the fine-particle filler 111a. It also gives slippability to the surface of the protective layer 111 containing the fine-particle filler 111a, and stabilizes the formability of the packaging material 110 during press-forming.

As the fine-particle filler 111a, it is possible to use an inorganic material such as silica, acrylic, alumina, barium sulfate, calcium carbonate, or titanium oxide, or acrylic beads, or the like. Using silica as the fine-particle filler 111a is preferable because it makes cracks in resin (whitening due to fine cracks) less likely to occur during press-forming of the packaging material 110. With an average particle diameter of 0.2 μm or less, the fine-particle filler 111a does not provide sufficient slippability. On the other hand, with an average particle diameter of 3 μm or more, the resin composition of the protective layer 111 is brittle.

It is preferable that the content ratio of the fine-particle filler 111a in the resin composition of the protective layer 111 be 5% or more but 50% or less by weight. Setting the content ratio of the fine-particle filler 111a at 5% or more by weight gives given slippability to the surface of the protective layer 111. Setting the content ratio of the fine-particle filler 111a at 50% or less by weight helps prevent film asperity on the surface of the protective layer 111. This helps prevent defects in appearance at the surface of the packaging material 110.

A coulter counter method is one method of measuring particle diameter and particle diameter distribution. Specifically, in an electrolyte solution, a partition wall having one small hole is placed; electrodes are placed one on each side of the partition wall, and when a voltage is applied, an electric current passes; the resistance to it depends on the volume of the small-hole portion of the partition wall. The electrolyte solution is dispersed with the fine-particle filler 111a to make a dilute suspension liquid; suction from one side lets particles pass through the small hole, and this causes the electrolyte to reduce by as large a volume, resulting in a increase in electrical resistance. Thus, the variation in resistance indicates the volume of particles, and the number of incidences of change in resistance indicates particles. In this way, diameter distribution is measured.

According to this embodiment, the protective layer 111 containing the fine-particle filler 111a is given a matte appearance, and is thereby given designability. Moreover, the surface of the protective layer 111 is given slippability, and this stables the formability of the packaging material 110 during press-forming. Moreover, using the silica-based fine-particle filler 111a makes the protective layer 111 less likely to suffer defects in appearance due to cracks in resin (whitening due to fine cracks) during press-forming of the packaging material 110.

Fourth Embodiment

Figure 6:
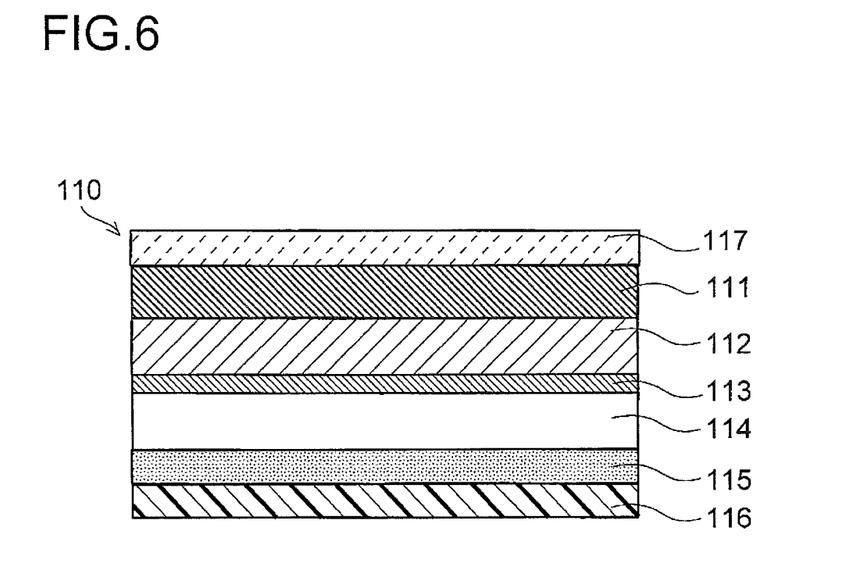
FIG. 6 is a schematic sectional view showing the layer structure of a packaging material according to a fourth embodiment of the present invention.

FIG. 6 is a sectional view showing an electrochemical cell packaging material 110 for a packaging member 120 according to a fourth embodiment of the present invention. For the sake of convenience of description, such features as find their counterparts in the first and second embodiments shown in FIGS. 1 to 4 described above are identified by common reference signs. In this embodiment, on the surface of the protective layer 111 of the packaging material 110, a slipping agent layer 117 is provided.

Figure 7:
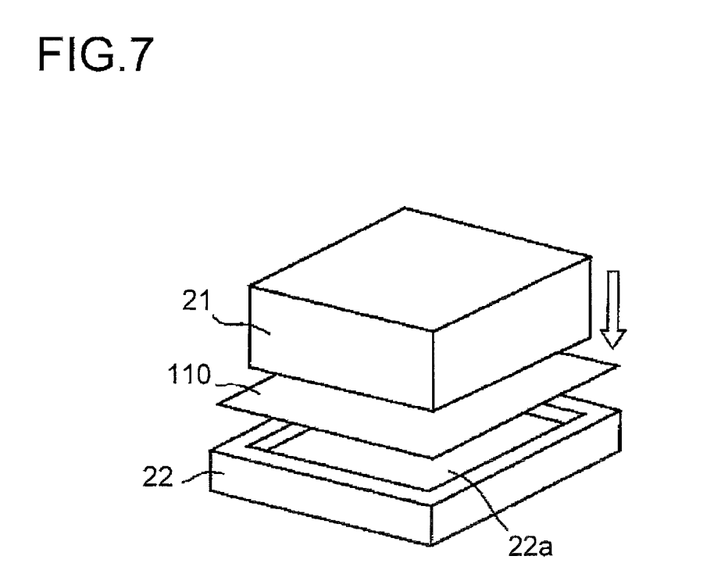
FIG. 7 is a diagram illustrating a process of press-forming.

FIG. 6 is a diagram illustrating the process of press-forming the packaging material 110. In a case where the packaging member 120 of the lithium-ion cell 121 is embossed, a sheet-form packaging material 110 cut in a predetermined shape is press-formed to form the housing portion 120a. The press-forming is performed with the packaging material 110 held between a concave mold 22, which has a side wall around it and is open at the top, and a convex mold 21.

Specifically, the packaging material 110 is placed on the concave mold 22 such that the slipping agent layer 117 makes contact with the inner surface 22a of the concave mold 22, and is pressed from the thermally adhesive layer 116 side using the convex mold 21. In this way, while the peripheral part of the packaging material 110 is drawn into the concave mold 22, a side wall is formed on the packaging material 110. Meanwhile, as the metal thin layer 114 deforms, the other resin layers of the packaging material 110 deform. Thus, if slippability between the base material layer 112 and the inner surface of the concave mold 22 is low, the base material layer 112, failing to follow the deformation of the metal thin layer 114, may break. This problem is increasingly likely to occur the greater the height of the side wall (the depth of formation) of the housing portion 120a formed by press-forming.

This is the reason that, in the packaging material 110 of this embodiment, the slipping agent layer 117 is provided on the surface of the protective layer 111. This stabilizes, indirectly via the slipping agent layer 117, the slidability between the concave mold 22 and the base material layer 112. This increases the limit depth to which the packaging material 110 can be formed, and allows stable embossing.

The slipping agent layer 117 is formed, for example, by roll coating or spraying of a 0.1% to 10% solution of an aliphatic acid amide in a solvent such as isopropyl alcohol, ethyl acetate, toluene, or methyl-ethyl ketone. Examples of aliphatic acid amides include oleic acid amide, erucic acid amide, strearic acid amide, behenic acid amide, ethylene bis-oleic acid amide, and ethylene bis-erucic acid amide. A sufficiently effective amount of the aliphatic acid amide deposited or sprayed is 0.1 mg or more per square meter. By setting the amount at 10 mg or less per square meter, it is possible to prevent contamination of the concave mold 22 and of the heat-sealing machine.

The entire surface of the protective layer 111 may be coated or sprayed with the slipping agent, or only the part that is embossed between the molds may be coated or sprayed. The packaging material 110 may be coated or sprayed beforehand and stored in a wound form; however, coating or spraying it immediately before forming provides better formability.

Hereinafter, the workings and benefits of the present invention will be described specifically by way of practical examples and comparison examples. In the experiments, a protective layer was formed on the top surface of the base material layer forming an electrochemical cell packaging material, and was exposed to drops of electrolyte liquid to evaluate occurrence of whitening in the base material layer, development of defects in appearance due to cracks in resin (whitening due to fine cracks) during forming (drawing), slippability on the protective layer, and suitability for forming.

[Electrochemical Cell Packaging Material Sample Fabrication 1]

Chemical conversion treatment was applied to both surfaces of aluminum, and to one chemical-conversion-treated surface, an oriented nylon film (with a thickness of 25 µm) was bonded by dry lamination with a polyester-based adhesive interposed such that the adhesive layer has a thickness of about 4 µm. Subsequently, on the other chemical-conversion-treated surface, acid-modified polypropylene (with a thickness of 23 µm, hereinafter abbreviated to acid-modified PP) and polypropylene (with a thickness of 23 µm, hereinafter abbreviated to PP) were laminated by co-extrusion. On the top surface of the oriented nylon film, a protective film was formed.

Thus, an electrochemical cell packaging material was obtained which has the structure: protective film/oriented nylon film/polyester-based adhesive/aluminum chemical-conversion-treated on both surfaces/acid-modified polypropylene/polypropylene.

As the chemical-conversion-treated layers, a treatment liquid composed of phenol resin, a chromium fluoride compound, and phosphoric acid was applied by roll-coating, and was baked under the condition that the coating temperature was 180° C. or more. Here, the applied amount of chromium was 10 mg/m$^2$ (by dry weight).

Practical Example 1

In the electrochemical cell packaging material according to Practical Example 1, to the top surface of the base material layer of the above-described electrochemical cell packaging material, epoxy resin having bisphenol A as skeletal units was applied at an application amount of 2.5 g/m$^2$, and was, after drying, heated for two minutes at 190° C. to form a cured film as the protective layer.

Practical Example 2

In the electrochemical cell packaging material according to Practical Example 2, to the top surface of the protective layer of the electrochemical cell packaging material of Practical Example 1, erucic acid amide was applied at an application amount of 0.2 mg/m$^2$ by gravure printing to form a slipping agent layer on the top surface of the protective layer.

Practical Example 3

In the electrochemical cell packaging material according to Practical Example 3, to the top surface of the protective layer of the electrochemical cell packaging material of Practical Example 1, ethylene bis-oleic acid amide was applied at an application amount of 0.2 mg/m$^2$ by gravure printing to form a slipping agent layer on the top surface of the protective layer.

Comparison Example 1

In the electrochemical cell packaging material according to Comparative Example 1, to the top surface of the base material layer of the above-described electrochemical cell packaging material, epoxy resin having hexamethylenediamine as skeletal units was applied at an application amount of 2.5 g/m$^2$, and was, after drying, heated for two minutes at 190° C. to form a cured film as the protective layer.

Comparison Example 2

In the electrochemical cell packaging material according to Comparative Example 2, to the top surface of the base material layer of the above-described electrochemical cell packaging material, polyester-based resin having a curing agent containing the isocyanate group added to it was applied at an application amount of 2.5 g/m$^2$, and was, after drying, heated for three days at 45° C. to form a cured film as the protective layer.

Comparison Example 3

In the electrochemical cell packaging material according to Comparative Example 3, to the top surface of the base material layer of the above-described electrochemical cell packaging material, acrylic-based resin having a curing agent containing the isocyanate group added to it was applied at an application amount of 2.5 g/m$^2$, and was, after drying, heated for three days at 45° C. to form a cured film as the protective layer.

Comparison Example 4

In the electrochemical cell packaging material according to Comparative Example 4, to the top surface of the base material layer of the above-described electrochemical cell packaging material, olefin-based resin having a curing agent containing the isocyanate group added to it was applied at an application amount of 2.5 g/m$^2$, and was, after drying, heated for three days at 45° C. to form a cured film as the protective layer.

[Electrochemical Cell Packaging Material Sample Fabrication 2]

Chemical conversion treatment was applied to both surfaces of aluminum, and to one chemical-conversion-treated surface, an oriented nylon film (with a thickness of 25 µm) was bonded by dry lamination with a polyester-based adhesive interposed such that the adhesive layer has a thickness of about 4 µm. Subsequently, on the other chemical-conversion-treated surface, acid-modified polypropylene (with a thickness of 23 µm, hereinafter abbreviated to acid-modified PP) and polypropylene (with a thickness of 23 µm, hereinafter abbreviated to PP) were laminated by co-extrusion. On the top surface of the oriented nylon film, a protective film was formed.

Thus, an electrochemical cell packaging material was obtained which has the structure: protective film/oriented nylon film/polyester-based adhesive/aluminum chemical-conversion-treated on both surfaces/acid-modified polypropylene/polypropylene.

The chemical conversion treatment was performed by applying a treatment liquid composed of phenol resin, a chromium fluoride compound, and phosphoric acid by roll-coating, and baking under the condition that the coating temperature was 180° C. or more. Here, the applied amount of chromium was 10 mg/m² (by dry weight).

Moreover, to the polyester-based adhesive, as a coloring pigment, 15% by weight of carbon black as a solid content was added.

Practical Example 4

In the electrochemical cell packaging material according to Practical Example 4, to the top surface of the base material layer of the above-described electrochemical cell packaging material, epoxy resin having bisphenol A as skeletal units was applied at an application amount of 2.5 g/m², and was, after drying, heated for two minutes at 190° C. to form a cured film as the protective layer.

Practical Example 5

In the electrochemical cell packaging material according to Practical Example 5, to the top surface of the base material layer of the above-described electrochemical cell packaging material, epoxy resin containing 15% by weight of fine-particle silica with an average particle diameter of 0.7 µm and having bisphenol A as skeletal units was applied at an application amount of 2.5 g/m², and was, after drying, heated for two minutes at 190° C. to form a cured film as the protective layer.

Practical Example 6

In the electrochemical cell packaging material according to Practical Example 6, to the top surface of the base material layer of the above-described electrochemical cell packaging material, acrylic-based resin having a curing agent containing the isocyanate group added to it was applied at an application amount of 2.5 g/m², and was, after drying, heated for three days at 45° C. to form a cured film as the protective layer.

Practical Example 7

In the electrochemical cell packaging material according to Practical Example 7, to the top surface of the base material layer of the above-described electrochemical cell packaging material, olefin-based resin having a curing agent containing the isocyanate group added to it was applied at an application amount of 2.5 g/m², and was, after drying, heated for three days at 45° C. to form a cured film as the protective layer.

Practical Example 8

In the electrochemical cell packaging material according to Practical Example 8, to the top surface of the base material layer of the above-described electrochemical cell packaging material, polyfunctional urethane acrylate containing 3% by weight of a photopolymerization initiator and having a functional group number of 5 with respect to the acryloyl group was applied at an application amount of 2.5 g/m², and was, after drying, irradiated for five seconds with a high-pressure mercury lamp having an energy of 100 W/cm² to form a cured film as the protective layer.

Practical Example 9

In the electrochemical cell packaging material according to Practical Example 9, to the top surface of the base material layer of the above-described electrochemical cell packaging material, polyfunctional urethane acrylate containing 3% by weight of a photopolymerization initiator and having a functional group number of 6 with respect to the acryloyl group was applied at an application amount of 2.5 g/m², and was, after drying, irradiated for five seconds with a high-pressure mercury lamp having an energy of 100 W/cm² to form a cured film as the protective layer.

Practical Example 10

In the electrochemical cell packaging material according to Practical Example 10, to the top surface of the base material layer of the above-described electrochemical cell packaging material, epoxy resin having, added to it, 15% by weight of fine-particle barium sulfate with an average particle diameter of 0.7 µm and having bisphenol A as skeletal units was applied at an application amount of 2.5 g/m², and was, after drying, heated for two minutes at 190° C. to form a cured film as the protective layer.

Practical Example 11

In the electrochemical cell packaging material according to Practical Example 11, to the top surface of the base material layer of the above-described electrochemical cell packaging material, epoxy resin having, added to it, 15% by weight of fine-particle calcium carbonate with an average particle diameter of 0.7 µm and having bisphenol A as skeletal units was applied at an application amount of 2.5 g/m², and was, after drying, heated for two minutes at 190° C. to form a cured film as the protective layer.

Practical Example 12

In the electrochemical cell packaging material according to Practical Example 12, to the top surface of the protective layer of the electrochemical cell packaging material of Practical Example 5, erucic acid amide was applied at an application amount of 0.2 mg/m² by gravure printing to form a slipping agent layer on the top surface of the protective layer.

Practical Example 13

In the electrochemical cell packaging material according to Practical Example 13, to the top surface of the protective layer of the electrochemical cell packaging material of Practical Example 5, ethylene bis-oleic acid amide was applied at an application amount of 0.2 mg/m² by gravure printing to form a slipping agent layer on the top surface of the protective layer.

Comparison Example 5

In the electrochemical cell packaging material according to Comparative Example 5, to the top surface of the base material layer of the above-described electrochemical cell packaging material, epoxy resin having hexamethylenediamine as skeletal units was applied at an application amount of 2.5 g/m², and was, after drying, heated for two minutes at 190° C. to form a cured film as the protective layer.

Comparison Example 6

In the electrochemical cell packaging material according to Comparison Example 6, to the top surface of the base material layer of the above-described electrochemical cell packaging material, polyfunctional urethane acrylate containing 3% by weight of a photopolymerization initiator and having a functional group number of 3 with respect to the acryloyl group was applied at an application amount of 2.5 g/m², and was, after drying, irradiated for five seconds with a high-pressure mercury lamp having an energy of 100 W/cm² to form a cured film as the protective layer.

Comparison Example 7

In the electrochemical cell packaging material according to Comparison Example 7, to the top surface of the base material layer of the above-described electrochemical cell packaging material, polyfunctional urethane acrylate containing 3% by weight of a photopolymerization initiator and having a functional group number of 4 with respect to the acryloyl group was applied at an application amount of 2.5 g/m², and was, after drying, irradiated for five seconds with a high-pressure mercury lamp having an energy of 100 W/cm² to form a cured film as the protective layer.

[Evaluation of Resistance to Electrolyte Liquid]

Electrolyte resistance was evaluated in the following manner: for each of Practical Examples 1 to 13 and Comparison Examples 1 to 7, the protective-layer side of the packaging material was exposed to drops of 3 cc of electrolyte (a liquid containing ethylene carbonate, diethyl carbonate, and dimethyl carbonate in the ratio of 1:1:1 with 1 mol of lithium hexafluorophosphate added to it); after the lapse of 30 minutes, the fallen drops of electrolyte were wiped off with a wipe soaked with isopropyl alcohol (IPA), and whether or not the surface of the packaging material has whitened was inspected visually. The results are shown in Tables 1 and 3.

[Evaluation of Cracks in Resin During Forming]

Cracks in resin during forming were evaluated in the following manner: for each of Practical Examples 1 to 13 and Comparison Examples 1 to 7, the packaging material was cut into a piece sized 80 mm×120 mm; the piece was then cold-formed to have a depth of 6.0 mm using a mold (concave mold) with an opening sized 30 mm×50 mm and a corresponding mold (convex mold); then whether cracks in resin (whitening due to fine cracks) have occurred in the protective-layer-side surface of the packaging material was inspected visually. The results are shown in Tables 1 and 3.

[Evaluation of Slippability]

Slippability was evaluated in the following manner: for each of Practical Examples 1 to 5 and 10 to 13, the packaging material was cut into pieces sized 150 mm×60 mm; the pieces were laminated, with the protective-layer surface or the slipping-agent-layer surface of one on that of the other under a load of 100 g, and the dynamic friction coefficient was measured on a friction tester (HEIDON TYPE14 model manufactured by Shinto Scientific Co., Ltd.). The measurement speed was 100 mm/min. The results are shown in Tables 1 and 3.

[Evaluation of Forming Suitability]

Forming suitability was evaluated in the following manner. For each of Practical Examples 1 to 5 and 10 to 13, the packaging material was cut into strips sized 80 mm×120 mm. Next, the strips were placed on the mold (concave mold) with the thermal adhesion layer facing the other folding mold (convex mold), and then the strips were, while being pressed under a pressure (surface pressure) of 0.16 MPa, press-formed by cold forming into depths of 4.0 mm, 5.0 mm, 6.0 mm, and 7.0 mm, 30 strips for each depth. Whether a pin hole appears in the packaging material meanwhile was inspected. Such 30 strips of which none developed a pinhole were evaluated as acceptable OK), and those of which one or more developed a pinhole were evaluated as unacceptable (NG). The results are shown in Tables 2 and 4. The mold (convex) has a rectangular shape sized 55 mm×32 mm (with a corner radius of 2 mm and a ridge line radius of 1 mm), and the mold (concave) has a clearance of 0.3 mm compared with the convex mold.

TABLE 1

|  | Electrolyte Resistance | Cracks in Resin During Forming | Slidability |
| --- | --- | --- | --- |
| Practical Example 1 | OK | OK | Poor (0.59) |
| Practical Example 2 | OK | OK | Good (0.21) |
| Practical Example 3 | OK | OK | Good (0.23) |
| Comparison Example 1 | NG | OK | — |
| Comparison Example 2 | NG | OK | — |
| Comparison Example 3 | OK | NG | — |
| Comparison Example 4 | OK | NG | — |

TABLE 2

|  | Forming Depth | | | |
| --- | --- | --- | --- | --- |
|  | 4.0 mm | 5.0 mm | 6.0 mm | 7.0 mm |
| Practical Example 1 | OK | NG | NG | NG |
| Practical Example 2 | OK | OK | OK | OK |
| Practical Example 3 | OK | OK | OK | OK |

TABLE 3

|  | Electrolyte Resistance | Cracks in Resin During Forming | Slidability |
| --- | --- | --- | --- |
| Practical Example 4 | OK | OK | Poor (0.59) |
| Practical Example 5 | OK | OK | Fair (0.41) |
| Practical Example 6 | OK | NG | — |
| Practical Example 7 | OK | NG | — |
| Practical Example 8 | OK | NG | — |
| Practical Example 9 | OK | NG | — |
| Practical Example 10 | OK | NG | Fair (0.44) |
| Practical Example 11 | OK | NG | Fair (0.44) |
| Practical Example 12 | OK | OK | Good (0.19) |
| Practical Example 13 | OK | OK | Good (0.20) |
| Comparison Example 5 | NG | OK | — |
| Comparison Example 6 | NG | NG | — |
| Comparison Example 7 | NG | NG | — |

TABLE 4

| | Forming Depth | | | |
|---|---|---|---|---|
| | 4.0 mm | 5.0 mm | 6.0 mm | 7.0 mm |
| Practical Example 4 | OK | NG | NG | NG |
| Practical Example 5 | OK | OK | NG | NG |
| Practical Example 10 | OK | OK | NG | NG |
| Practical Example 11 | OK | OK | NG | NG |
| Practical Example 12 | OK | OK | OK | OK |
| Practical Example 13 | OK | OK | OK | OK |

As shown in Table 1, the packaging materials according to Practical Examples 1 to 3 exhibited no whitening on the protective-layer-side surface (OK) even on exposure to drops of electrolyte and no cracks in resin (whitening due to fine cracks) during press-forming (drawing) (OK). By contrast, the packaging materials according to Comparative Examples 1 and 2 exhibited whitening on the protective-layer-side surface was observed (NG) on exposure to drops of electrolyte. The packaging materials according to Comparative Examples 3 and 4 exhibited no whitening on the protective-layer-side surface was observed (OK) on exposure to drops of electrolyte, but exhibited cracks in resin (whitening due to fine cracks) during press-forming (drawing) (NG).

Practical Examples 2 and 3, where a slipping agent layer was provided on the surface of the protective layer, exhibited dynamic friction coefficients of 0.25 or less, and thus exhibited slipping superior to that in Practical Example 1, where no slipping agent layer was provided.

As shown in Table 2, Practical Examples 2 and 3, where a slipping agent layer was provided on the surface of the protective layer, exhibited forming suitability superior to that in Practical Example 1, where no slipping agent layer was provided.

As shown in Table 3, the packaging materials according to Practical Examples 4, 5, 12, and 13 exhibited neither whitening on the protective-layer-side surface (OK) on exposure to drops of electrolyte liquid, nor cracks in resin (whitening due to fine cracks) during press-forming (drawing) (OK). By contrast, the packaging materials according to Practical Examples 6 to 11 exhibited no whitening on the protective-layer-side surface on exposure to drops of electrolyte liquid (OK), but exhibited cracks in resin (whitening due to fine cracks) during press-forming (drawing) (NG). The packaging material according to Practical Example 5 exhibited whitening on the protective-layer-side surface on exposure to drops of electrolyte liquid (NG). The packaging materials according to Practical Examples 6 and 7 exhibited whitening on the protective-layer-side surface on exposure to drops of electrolyte liquid (NG), and also exhibited cracks in resin (whitening due to fine cracks) during press-forming (drawing) (NG).

Practical Examples 5, 10, and 11, where a fine-particle filler was added, exhibited dynamic friction coefficients of 0.50 or less, and thus exhibited slipping superior to that in Practical Example 4, where no fine-particle filler was added. Practical Examples 12 and 13, where a slipping agent layer was provided on the surface of the protective layer, exhibited dynamic friction coefficients of 0.25 or less, and thus exhibited slipping superior to that in Practical Example 5, where no slipping agent layer was provided.

As shown in Table 4, Practical Examples 5, 10, and 11, where a fine-particle filler was added, exhibited forming suitability superior to that in Practical Example 4, where no fine-particle filler was added. Practical Examples 12 and 13, where a slipping agent layer was provided on the surface of the protective layer, exhibited forming suitability superior to that in Practical Example 5, where no slipping agent layer was provided.

INDUSTRIAL APPLICABILITY

The present invention finds application as packaging materials for packaging chemical cells such as nickel-hydride cells, nickel-cadmium cells, lithium-metal primary cells, secondary cells, and lithium-polymer cells, electric double-layer capacitors, capacitors, and electrolytic capacitors.

LIST OF REFERENCE SIGNS 110 packaging material
111 protective layer
112 base material layer
113 adhesive layer
114 barrier layer
115 acid-modified polyolefin layer
116 thermally adhesive layer
117 slipping agent layer
120 packaging member
120a housing portion
120b sheet portion
121 lithium-ion cell
122 lithium-ion cell module
123a cathode tab
123b anode tab

The invention claimed is:

1. A press-formable electrochemical cell packaging material comprising, as layers laminated together, at least:
   a base material layer formed of a resin film;
   a protective layer arranged as an outer layer, for protecting the base material layer;
   a thermally adhesive layer arranged as an innermost layer and formed of a thermally adhesive resin; and
   a barrier layer arranged between the base material layer and the thermally adhesive layer and formed of a metal foil,
   wherein the protective layer is formed of an epoxy resin having bisphenol A or bisphenol F as skeletal units and having an epoxy equivalent in a range from 100 to 5000, and comprises a fine-particle filler.

2. The electrochemical cell packaging material according to claim 1,
   wherein
   the base material layer and the barrier layer are bonded together by dry lamination with an adhesive containing a pigment.

3. The electrochemical cell packaging material according to claim 2,
   wherein the pigment comprises carbon black.

4. The electrochemical cell packaging material according to claim 1,
   wherein a slipping agent layer is provided on a surface of the protective layer.

5. The electrochemical cell packaging material according to claim 4,
   wherein the slipping agent layer comprises an aliphatic amide-based resin.

6. The electrochemical cell packaging material according to claim 2,
   wherein a slipping agent layer is provided on a surface of the protective layer.

7. The electrochemical cell packaging material according to claim 1,
wherein the resin film of the base material layer is an oriented nylon film.

\* \* \* \* \*